(12) United States Patent
Lee

(10) Patent No.: US 7,252,390 B2
(45) Date of Patent: Aug. 7, 2007

(54) PROJECTING OPTICAL SYSTEM

(75) Inventor: Seung Gyu Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 63 days.

(21) Appl. No.: 10/776,198

(22) Filed: Feb. 12, 2004

(65) Prior Publication Data

US 2005/0264764 A1    Dec. 1, 2005

(30) Foreign Application Priority Data

Feb. 12, 2003    (KR)    ............... 10-2003-0008898

(51) Int. Cl.
   *G03B 21/28* (2006.01)
   *G02F 1/1335* (2006.01)

(52) U.S. Cl. ............... 353/81; 353/33; 348/756

(58) Field of Classification Search ............. 353/98, 353/99, 81, 33, 31; 349/7–9, 57, 62; 348/756, 348/762, 771, 794, 742
   See application file for complete search history.

(56) References Cited

U.S. PATENT DOCUMENTS

| | | | | |
|---|---|---|---|---|
| 4,131,345 A | * | 12/1978 | Carollo ............... | 352/132 |
| 5,515,121 A | * | 5/1996 | Fujibayashi ............ | 353/81 |
| 6,008,951 A | * | 12/1999 | Anderson ............ | 359/677 |
| 6,280,034 B1 | | 8/2001 | Brennesholtz .......... | 353/20 |
| 6,375,330 B1 | * | 4/2002 | Mihalakis ............ | 353/31 |
| 6,540,359 B1 | * | 4/2003 | Cornelissen et al. ........ | 353/20 |
| 6,765,544 B1 | * | 7/2004 | Wynne Willson ........ | 345/6 |
| 6,827,450 B1 | * | 12/2004 | McGettigan et al. ........ | 353/31 |
| 2001/0021004 A1 | * | 9/2001 | Yano ................ | 353/31 |
| 2001/0021005 A1 | * | 9/2001 | Kuiseko et al. .......... | 353/33 |
| 2002/0122156 A1 | * | 9/2002 | Sawamura et al. ........ | 352/81 |
| 2002/0176146 A1 | | 11/2002 | De Vaan ............. | 359/242 |
| 2002/0180939 A1 | * | 12/2002 | Miyata et al. ........... | 353/70 |

FOREIGN PATENT DOCUMENTS

| | | |
|---|---|---|
| CN | 2485874 Y | 5/2002 |
| JP | 2001/142144 | 5/2001 |
| WO | WO 01/33865 | 5/2001 |
| WO | WO 01/033865 A1 | 5/2001 |
| WO | WO 01/55774 | 8/2001 |

OTHER PUBLICATIONS

Chinese Office Action dated Nov. 3, 2006.

* cited by examiner

*Primary Examiner*—W. B. Perkey
*Assistant Examiner*—Andrew Sever
(74) *Attorney, Agent, or Firm*—Ked & Associates, LLP

(57) ABSTRACT

A projecting optical system for decreasing a height of an optical system is provided. The system includes a lamp for irradiating light, a color divider for dividing colors of light irradiated from the lamp, an illumination mixer for irradiating the light with equal light intensity, a channel-changing prism for changing a channel of light irradiated from the illumination mixer to upward and downward, and a TIR prism for changing a direction and angle of light to a predetermined direction and angle.

18 Claims, 5 Drawing Sheets

PROJECTING OPTICAL SYSTEM

CROSS-REFERENCE TO RELATED APPLICATIONS

This application claims the benefit of Korean Application No. P2003-08898, filed on Feb. 12, 2003, which is hereby incorporated by reference as if fully set forth herein.

BACKGROUND OF THE INVENTION

1. Field of the Invention

The present invention relates to a projector, and more particularly, to a projecting optical system.

2. Discussion of the Related Art

In recent years, projectors have become popular and various forms of projectors are manufactured. The projectors may be divided into products with light intensity applicable to a small screen and products with light intensity applicable to a large conference room or a theater. Also, projectors may be divided into projectors of a small portable size and projectors of a large size according based on purpose or use.

Display devices employed for projectors may be divided into LCD (Liquid Crystal Display) panels and DMD (Digital Micromirror Device) panels. In recent years, a plurality of projectors using the DMD panel, which is widely used, have been manufactured. The projector using the DMD panel is normally called a DLP (Digital Light Processing) panel.

A DMD panel used for a DLP projector includes a plurality of little micromirrors in a square form horizontally/vertically arranged which function as pixels. Tilting each micromirror around an axis of a diagonal line is performed by an electrical signal.

Therefore, when light is received by the DMD panel, an angle of the light reflected is changed by tilting the micromirrors. In this case, the angle of the light formed by tilting the micromirrors is not continuously changed, and the micromirrors are tilted in only two directions, such that a direction of the light is controlled using the micromirrors.

In this case, the micromirrors in the DMD panel are tilted in a diagonal direction of the micromirrors, and the light brought to incidence on the DMD panel needs to incidence in a direction at an angle of 45° to the diagonal line. The projecting optical system described below in accordance with a related art includes a TIR prism or mirror which is tilted by an electrical signal such that light brought to incidence on the TIR prism or mirror is at an angle of 45° to the diagonal line. Therefore, there is a problem in making the projector in a small size. This will be described in more detail referring to the appended drawings.

FIG. 1 is a top view of a projecting optical system in accordance with the related art. FIG. 2 illustrates a side view of a projecting optical system in accordance with the related art.

As illustrated in FIG. 1 and FIG. 2, the projecting optical system includes a lamp 101 for generating light, a color divider 102 for transmitting a particular wave of light, a illumination mixer 103 for receiving transmitted light and equally distributing the luminosity, a first illumination lens 104 and a second illumination lens 105 for controlling the luminosity, a first mirror 106 and a second mirror 107 for changing the direction of light, a TIR prism 108 for changing the angle of light to a particular angle, a DMD panel 109 for controlling light and darkness of an image by tilting the micromirrors (not illustrated), and a projecting lens 110 for receiving light reflected by the DMD panel 109 and projecting the light in a predetermined direction.

The projecting optical system composed as aforementioned in accordance with the related art will be described below. First, the lamp 101 irradiates light through a bulb that forms light and a reflective mirror that reflects light. Then, the light irradiated from the lamp 101 is divided into a plurality of colors according to time by rotation of the color divider 103 and then brought to incidence on the illumination mixer 103. In this case, the color divider 102 includes a plurality of filters for transmitting or reflecting only a particular color (red, green, blue) with the particular wave, and is rotatably provided via a motor.

The illumination mixer 103 maintains luminosity on an emission plane although luminosity of light brought to incidence on an incidence plane is not equal. Accordingly, the emission plane performs a role of a plane light source.

The light equally irradiated as aforementioned is brought to incidence on the DMD panel 109 by the first lens 104 and the second lens 105. However, the light incident on the DMD panel 109 needs to have a predetermined angle. Desirably, the light should be brought to incidence on the DMD panel 109 in a direction at 45° to the diagonal line.

To be parallel with an axis of a projecting lens 110, the angle of the light incident on the DMD panel 109 in a normal direction also needs to be at a predetermined angle. Therefore, in the structure of the illumination optical system, as illustrated in FIG. 1 and FIG. 2, the first mirror 106 and the second mirror 107 are provided between the illumination lens 104 and the second illumination lens 105. The direction of the light is changed to upward and downward for irradiating the light in a diagonal direction of the micromirror corresponding to the pixel of the DMD panel 108. As a result, the TIR prism 108 is also provided in a direction inclined by 45° to the diagonal line of the pixel for transmitting or reflecting light according to a characteristic of the incident angle of light.

Therefore, light incident on the DMD panel in a predetermined direction at a predetermined angle is inclined to an angle enabling light indent on the projecting lens 110 or in an opposite direction by the electrical signal from outside so as to create a division of light and darkness on the screen.

In the case, as illustrated in FIG. 2, there is a problem in making the projecting optical system in a small size because a channel of the light needs to be moved a large amount and the height of the projecting optical system can not be lowered for bringing the light incident on the second illumination lens 105 at a top portion of the TIR prism inclined 45°.

SUMMARY OF THE INVENTION

Accordingly, the present invention is directed to a projecting optical system that substantially obviates one or more problems due to limitations and disadvantages of the related art.

An object of the present invention is to provide a projecting optical system for reducing a height of an optical system.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a projecting optical system includes a lamp for irradiating light, a color divider for dividing colors of light irradiated from the lamp, a illumination mixer for irradiating the light with equal light intensity, a channel-changing prism for changing a channel of light irradiated from the illumination mixer to upward and downward, and a TIR prism for changing a direction and angle of light to a predetermined direction and angle.

In this case, the channel-changing prism is rotatably provided for controlling step difference of incidence light. A reflective mirror is further included for changing the channel of light such that the light irradiated from the lamp is entered into the color divider. The channel-changing prism includes a distance between an axis of incidence light and an axis of emission light. The channel-changing prism is rotatably provided for controlling the step difference of emission light.

The TIR prism is inclined at a predetermined angle vertically and horizontally for maintaining the predetermined incidence angle of light required by the DMD panel.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 3:
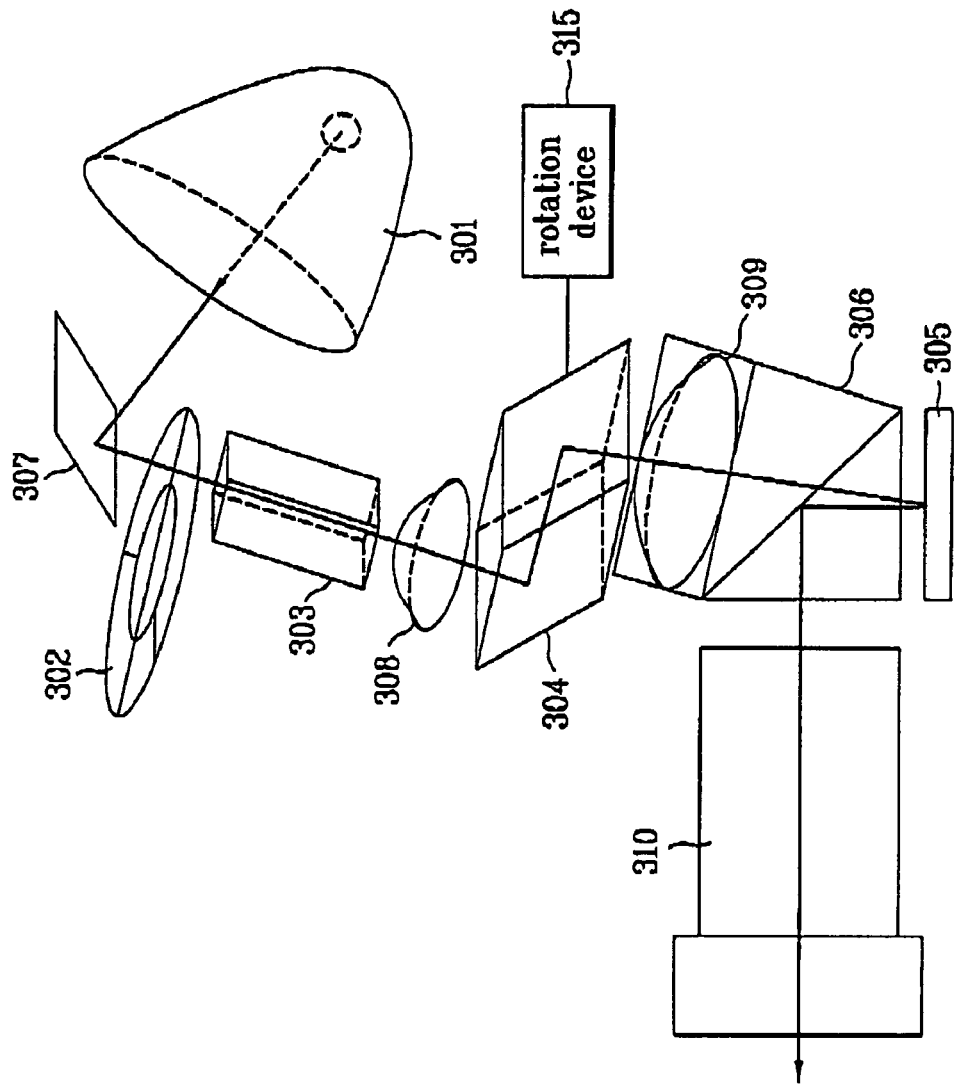
FIG. 3 illustrates a top view of a projecting optical system in accordance with the present invention.
Figure 4:
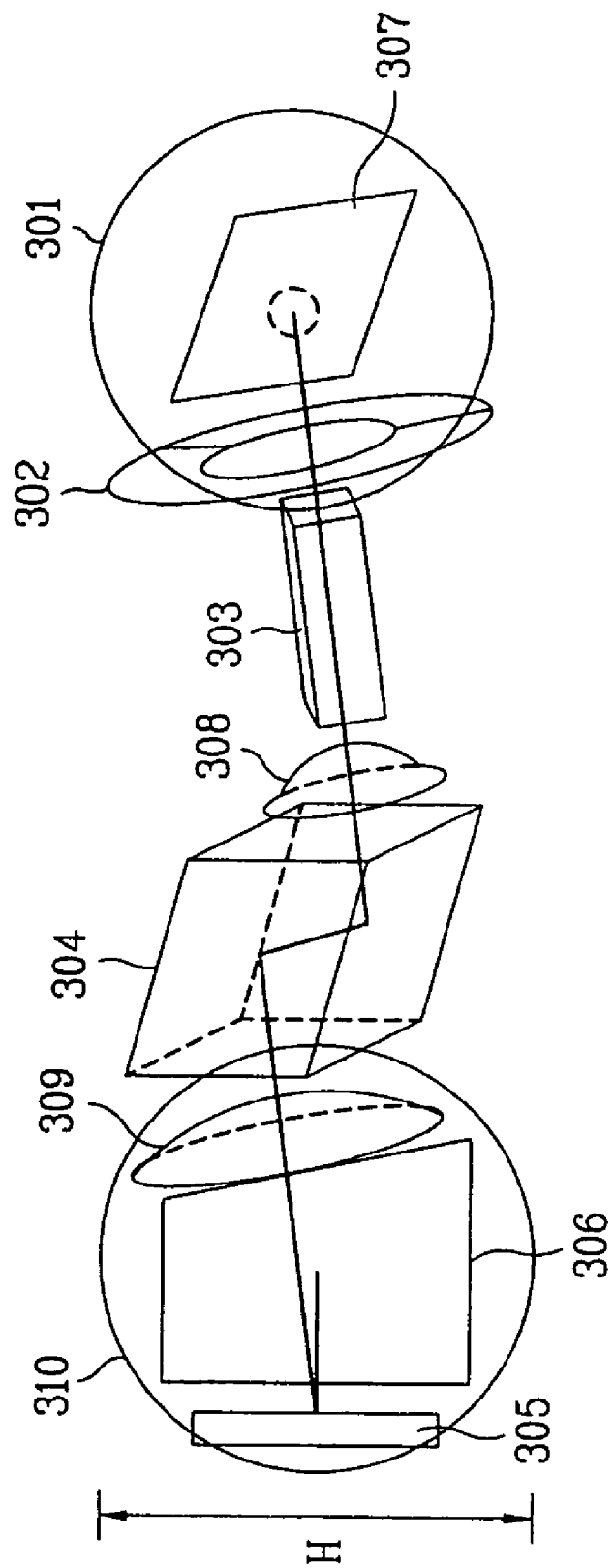
FIG. 4 illustrates a side view of a projecting optical system in accordance with the present invention.

FIG. 3 illustrates a top view of a projecting optical system in accordance with the present invention. FIG. 4 illustrates a side view of a projecting optical system in accordance with the present invention.

As illustrated in FIG. 3 and FIG. 4, the projecting optical system includes a lamp 301 having a bulb for generating light and a reflective mirror (not shown) for reflecting light, a color divider 302 for dividing colors of light according to time by rotating the light irradiated from the lamp 301, an illumination mixer 303 for mixing light received and irradiated from the color divider 302, of which luminosity is unevenly distributed, by reflecting the light therein so as to irradiate light of which luminosity is evenly distributed luminosity, a channel-changing prism 304 for changing the channel of light equally irradiated from the illumination mixer 303, and a TIR prism 306 for changing and irradiating the light irradiated from the channel-changing prism 304 in a predetermined direction at a predetermined angle.

In this case, the channel of the light from the lamp 301 is changed and entered into the color divider 302 or directly entered into the color divider by removing the reflective mirror 307.

The light from the illumination mixer 303 is passed through the first illumination lens 308, the channel-changing prism 304 and the second illumination lens 309, and entered into the DMD panel 305.

In this case, the first and second lens 308 and 309 each includes at least one lens and the axes of light between the first and second lens do not correspond with each other.

However, the channel-changing prism 304 is provided between the first illumination lens 308 and the second illumination lens 309 for keeping a predetermined distance (height difference of the light channel) between the axes.

The projecting optical system configured as aforementioned in a thin layer form according to the present invention will now be described in more detail referring to appended drawings.

First, the light entered into the color divider 302 from the lamp 301 is orderly divided by the rotation of the color divider 302 and entered into the illumination mixer 303. The illumination mixer 303 maintains luminosity on the emission plane although luminosity of light brought to incidence on the incidence plane is not equal. Accordingly, the emission plane performs the role of the plane light source.

The light irradiated from the illumination mixer 303 is entered into the DMD panel 305 by the first illumination lens 308 and the second lens 309. The first illumination lens 308 includes at least one lens and the second illumination lens 309 includes at least one lens.

In this case, the axes of light between the first illumination lens 308 and the second lens illumination lens 309 do not correspond with each other. However, the channel-changing prism 304 is provided between the first illumination lens 308 and the second illumination lens 309 for keeping a predetermined distance (height difference of the light channel) between the axes.

Figure 5A:
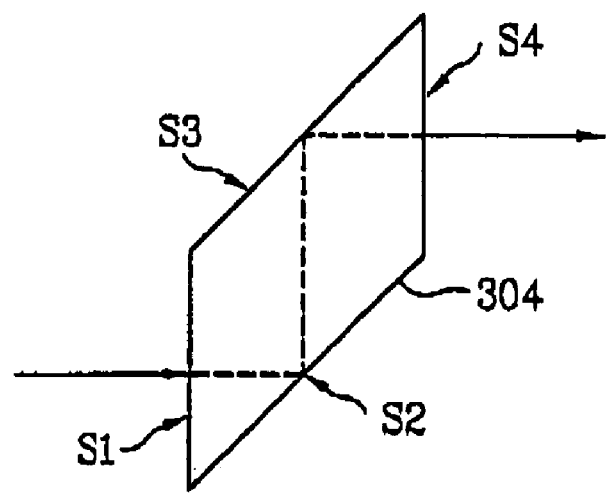
FIGS. 5A and 5B illustrates diagrams showing an operating principle of a channel-changing prism in a projecting optical system in accordance with the present invention.
Figure 5B:
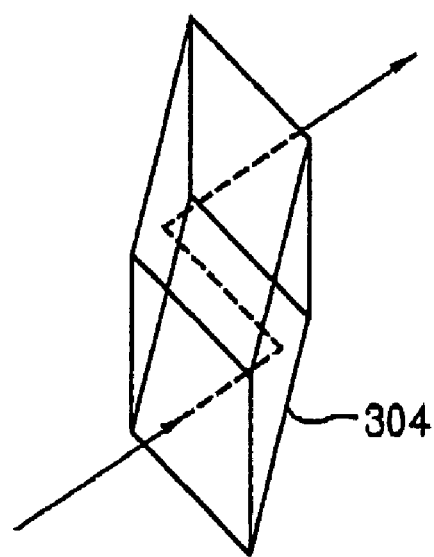

As illustrated in FIGS. 5A and 5B, the channel-changing prism 304 changes the channel of light incident on the incidence plane (S1) by a reflective plane (S2), and reflected again by another reflective plane (S3) so as to pass the emission plane (S4).

The channel-changing prism 304 is in a complete quadrilateral form, and the axis of the incidence light is at a predetermined distance from the axis of the emission light. Accordingly, the predetermined distance is formed in a vertical direction by rotation of the channel-changing prism by a rotation device 315 so as to perform an important role for changing the channel of light.

The light emitted from the first illumination lens 308 has a particular the step difference for vertical and horizontal directions by the channel-changing prism 304, and entered into the TIR prism 306 having a characteristic selectively transmitting or reflecting the light according to the angle at which the light is entered after passing through the second illumination lens 309.

The TIR prism 306 has a particular angle for vertical and horizontal directions and a characteristic for maintaining the incidence direction and angle of light required by the DMD panel 305.

As aforementioned, the light incident on the DMD panel 305 is reflected from the TIR prism 306 by tilting the micromirrors according to the external electrical signal so as to display light and darkness on the screen (not shown) by entering into the projecting lens 310 or not.

Figure 1:
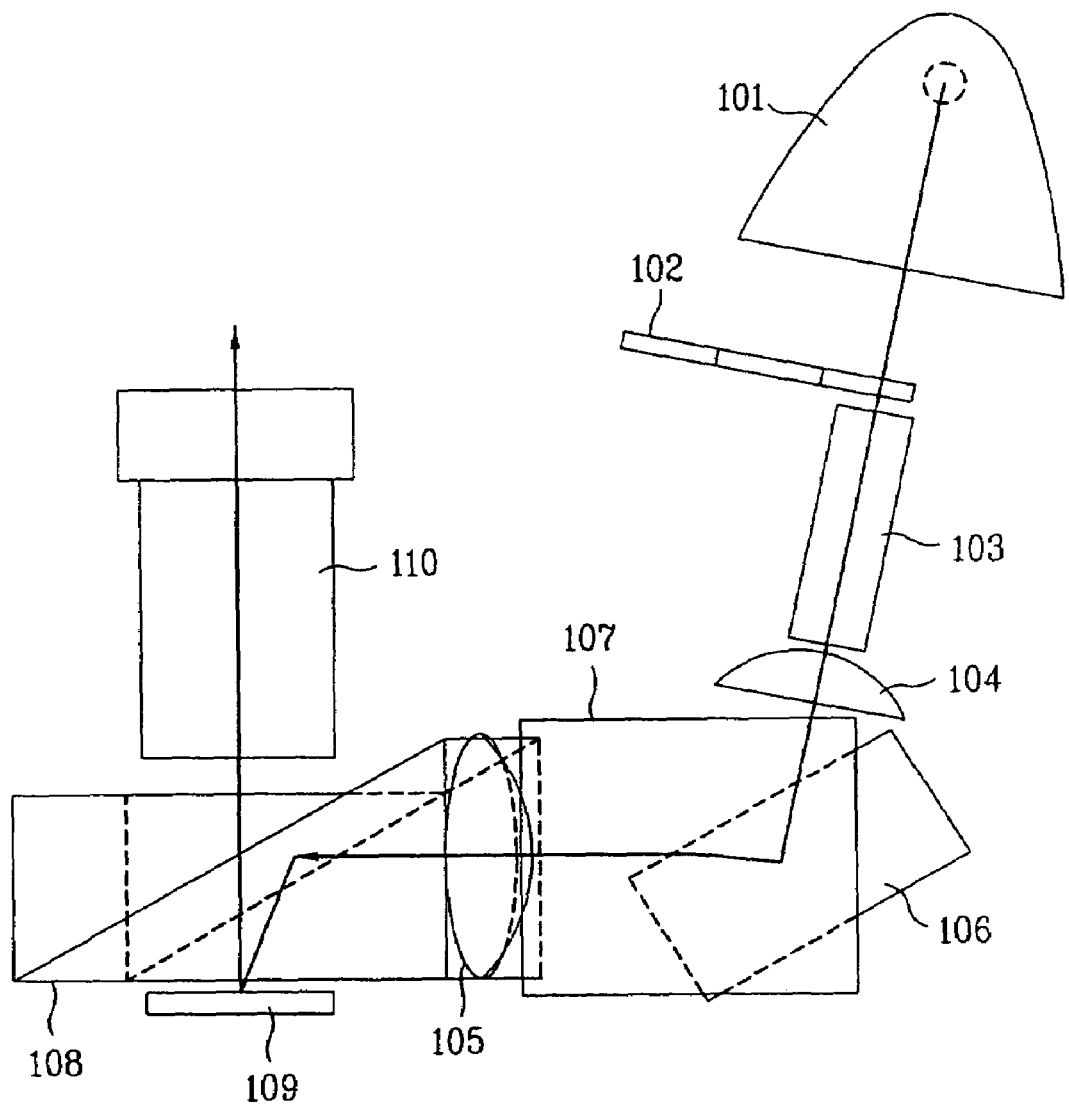
FIG. 1 illustrates a top view of a projecting optical system in accordance with a related art.
Figure 2:
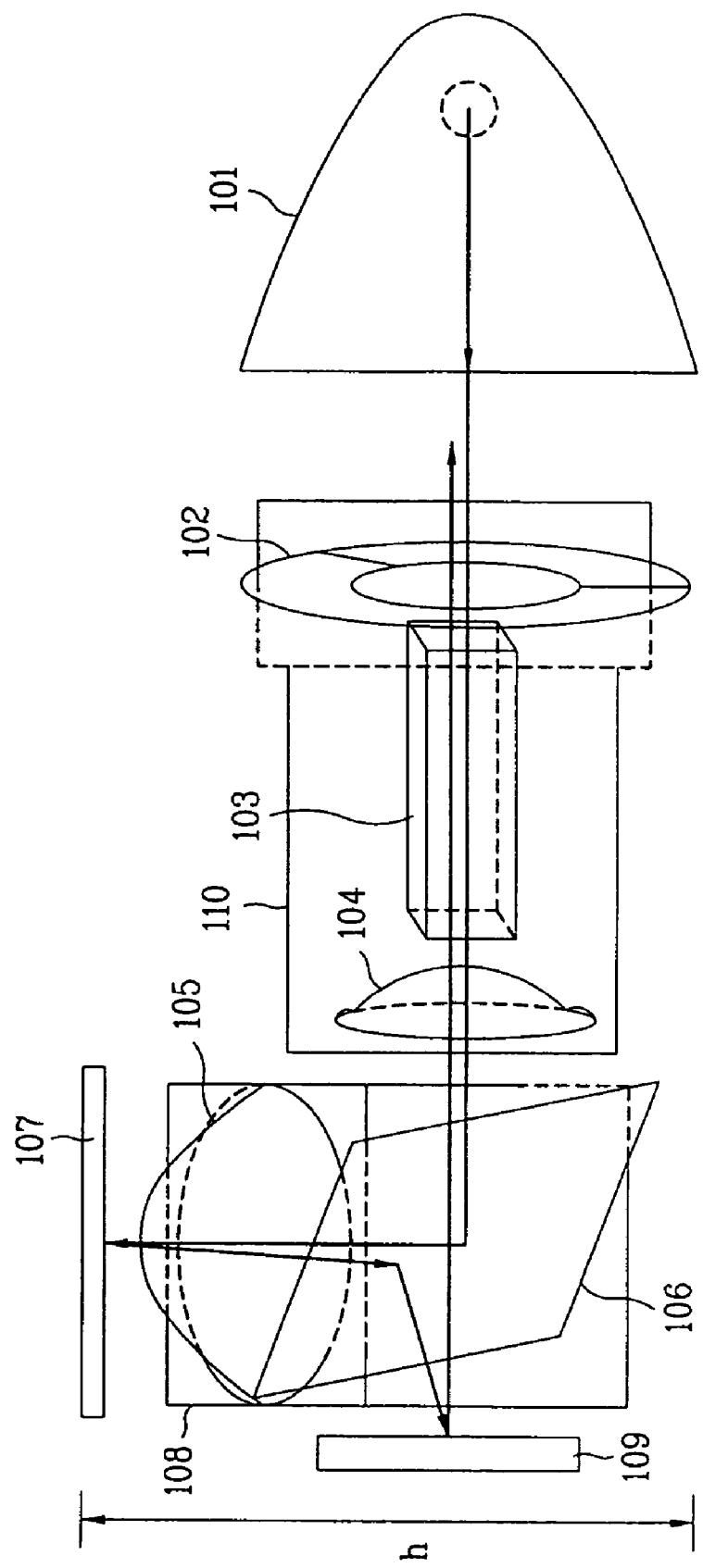
FIG. 2 illustrates a side view of a projecting optical system in accordance with a related art.

Referring to the side view of the projecting optical system in accordance with the present invention in FIG. 4, being different from the prior art in FIG. 2, the TIR prism 306 does not need to be rotated to maintain the predetermined incidence direction on the DMD panel nor does it need to be provided at a same location of the second mirror 107 illustrated in FIG. 2. Therefore, the height H of the projecting optical system illustrated in FIG. 4 is lower than the height h of the projecting optical system illustrated in FIG. 2

As another embodiment of the present invention, the color divider 302 is not provided between the lamp 301 and the illumination mixer 303 but between the illumination mixer 303 and the first illumination lens 308.

The projecting optical system as aforementioned has a following effects. First, a projector in a thin size can be manufactured because the height of the projecting optical system using the DMD panel can be reduced and has an effect of portability. Second, there is an effect of reducing the height of a set by applying the invention to not only the projector but also the projection TV.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A projecting optical system, comprising:
    a lamp configured to irradiate light;
    a color divider configured to divide colors of light irradiated from the lamp;
    a illumination mixer configured to irradiate the light received from the color divider with equal light intensity;
    a channel-changing prism configured to receive light irradiated from the illumination mixer and to provide a predetermined distance between an axis of incidence light and an axis of light emitted by the channel-changing prism by rotating;
    a rotation device configured to rotate the channel-changing prism; and
    a TIR prism for changing a direction and angle of light to a predetermined direction and angle, wherein the axis of incidence light and the axis of light emitted by the channel-changing prism are substantially parallel.

2. The projecting optical system of claim 1, further comprising a reflective mirror for changing the channel of light such that the light irradiated from the lamp is entered into the color divider.

3. The projecting optical system of claim 1, wherein at least one first illumination lens and second illumination lens for controlling the intensity of light are provided between the channel-changing prism.

4. The projecting optical system of claim 1, wherein the color divider comprises a plurality of optical means formed in a disk or cylindrical form and rotatably provided for selectively transmitting or reflecting a color.

5. A projector having a DMD panel comprising the projecting optical system of claim 1.

6. The projector of claim 5, further comprising a reflective mirror for changing the channel of light such that the light irradiated from the lamp is entered into the color divider.

7. The projector of claim 5, wherein at least one first illumination lens and second illumination lens for controlling the intensity of light are provided between the channel-changing prism.

8. The projector of claim 5, wherein the color divider comprises a plurality of optical means formed in a disk or cylindrical form and rotatably provided for selectively transmitting or reflecting a color.

9. The projector of claim 5, wherein the channel-changing prism is rotatably provided for controlling step difference of emission light.

10. The projector of claim 5, wherein the TIR prism is inclined at a predetermined angle vertically and horizontally for maintaining the predetermined incidence angle of light required by the DMD panel.

11. The projecting optical system of claim 5, wherein the predetermined distance extends in a substantially vertical direction.

12. The projecting optical system of claim 5, wherein the channel-changing prism comprises two substantially parallel reflective planes that provide the predetermined distance between the axis of incidence light and the axis of light emitted by the channel-changing prism.

13. The projecting optical system of claim 1, wherein the predetermined distance extends in a substantially vertical direction.

14. The projecting optical system of claim 1, wherein the channel-changing prism comprises two substantially parallel reflective planes that provide the predetermined distance between the axis of incidence light and the axis of light emitted by the channel-changing prism.

15. A projecting optical system, comprising:
    a lamp configured to irradiate light;
    a illumination mixer configured to irradiate the light received from the lamp with equal light intensity;
    a channel-changing prism configured to receive light irradiated from the illumination mixer and to provide a predetermined distance between an axis of incidence light and an axis of light emitted by the channel-changing prism by rotating;
    a rotation device configured to rotate the channel-changing prism; and
    a prism for changing a direction and angle of light to a predetermined direction and angle, wherein the axis of incidence light and the axis of light emitted by the channel-changing prism are substantially parallel.

16. The projecting optical system of claim 15, wherein the predetermined distance extends in a substantially vertical direction.

17. The projecting optical system of claim 15, wherein the channel-changing prism comprises two substantially parallel reflective planes that provide the predetermined distance between the axis of incidence light and the axis of light emitted by the channel-changing prism.

18. A projector having a DMD panel comprising the projecting optical system of claim 15.

* * * * *